United States Patent
Probst et al.

(10) Patent No.: US 12,234,403 B2
(45) Date of Patent: Feb. 25, 2025

(54) GAS PRESSURE SPRING COMPRISING AN EXPANDING WAX, DRIVE SYSTEM COMPRISING THE GAS PRESSURE SPRING

(71) Applicant: STABILUS GmbH, Koblenz (DE)

(72) Inventors: Ulrich Probst, Hillscheid (DE); Alexander Reiser, Münstermaifeld (DE); Martin Schleich, Saffig (DE); Felix Beib, Koblenz (DE)

(73) Assignee: STABILUS GMBH, Koblenz (DE)

( * ) Notice: Subject to any disclaimer, the term of this patent is extended or adjusted under 35 U.S.C. 154(b) by 122 days.

(21) Appl. No.: 17/926,325

(22) PCT Filed: May 17, 2021

(86) PCT No.: PCT/EP2021/063016
§ 371 (c)(1),
(2) Date: Nov. 18, 2022

(87) PCT Pub. No.: WO2021/233841
PCT Pub. Date: Nov. 25, 2021

(65) Prior Publication Data
US 2024/0026199 A1  Jan. 25, 2024

(30) Foreign Application Priority Data
May 20, 2020 (DE) .................... 10 2020 113 749.4

(51) Int. Cl.
*C09K 5/06* (2006.01)
*C08K 5/01* (2006.01)
(Continued)

(52) U.S. Cl.
CPC ............... *C09K 5/063* (2013.01); *C08K 5/01* (2013.01); *C08K 5/05* (2013.01); *C08L 91/06* (2013.01);
(Continued)

(58) Field of Classification Search
CPC . C09K 5/063; C08K 5/01; C08K 5/05; C08K 5/005; C08L 91/06; C08L 2205/02;
(Continued)

(56) References Cited

U.S. PATENT DOCUMENTS

| 4,010,829 A | 3/1977 | Naito et al. |
| 4,613,115 A | 9/1986 | Smith |
| 2013/0240053 A1 | 9/2013 | Lum et al. |

FOREIGN PATENT DOCUMENTS

| DE | 15 73 341 C2 | 10/1973 |
| DE | 25 11 289 A1 | 9/1975 |

(Continued)

OTHER PUBLICATIONS

International Search Report for PCT /EP2021/063016 issued on Aug. 27, 2021.

(Continued)

*Primary Examiner* — Cephia D Toomer
(74) *Attorney, Agent, or Firm* — Schmeiser, Olsen & Watts, LLP

(57) ABSTRACT

A gas pressure spring is provided including an expanding wax as a compensating medium for reducing a temperature dependency of a spring force of the gas pressure spring in an operating temperature range of the gas pressure spring spanning a minimum temperature of −40° C. to +10° C. up to a maximum temperature of +40° C. to +100° C. The expanding wax includes at least one liquid phase and at least one solid phase in the entire operating temperature range, the expanding wax comprising a number of primary alcohols. Also provided is a drive system for a flap including a gas pressure spring for supporting the flap, and an electromechanical drive for driving the flap.

9 Claims, 1 Drawing Sheet

(51) Int. Cl.
  C08K 5/05    (2006.01)
  C08L 91/06   (2006.01)
  E05F 3/02    (2006.01)
  F16F 9/52    (2006.01)
  F16F 9/53    (2006.01)

(52) U.S. Cl.
  CPC ............... *E05F 3/02* (2013.01); *F16F 9/526* (2013.01); *F16F 9/53* (2013.01); *C08L 2205/02* (2013.01); *E05Y 2900/50* (2013.01); *F16F 2222/126* (2013.01); *F16F 2224/048* (2013.01); *F16F 2228/002* (2013.01)

(58) Field of Classification Search
  CPC ...... E05F 3/02; F16F 9/526; F16F 9/53; F16F 2222/126; F16F 2224/048; F16F 2228/002; F16F 9/02; F16F 9/52; E05Y 2900/50
  See application file for complete search history.

(56) References Cited

FOREIGN PATENT DOCUMENTS

| | | |
|---|---|---|
| DE | 31 41 295 A1 | 4/1983 |
| DE | 203 02 342 U1 | 4/2003 |
| DE | 103 13 440 A1 | 10/2004 |
| DE | 10 2008 045 903 A1 | 3/2010 |
| DE | 10 2014 208 355 A1 | 11/2015 |
| EP | 1 795 777 A2 | 6/2007 |
| KR | 20060019794 | * 3/2006 |

OTHER PUBLICATIONS

Anonymous. "Rubitherm RT35 Data sheet" Oct. 9, 2020 (Oct. 9, 2020). pp. 1-1, Retrieved from the Internet: https ://www .rubitherm. eu/media/products/datasheets.Techdata_-RT35_EN_09102020. PDF.

Anonymous. "Dilavest. thermostat waxes" Mar. 1, 2019 (Mar. 1, 2019). pp. 1-3, Retrieved from the Internet:. https ://www.paramelt. com/wp-content/uploads/2019/03/Dilavest-product-leaflet-2012_04. pdf.

Anonymous. "Mahle Behr GmbH & Co. KG" Sep. 30, 2020 (Sep. 20, 2020). pp. 1-3, Retrieved from the Internet: https://de.wikipedia.org/wiki/Mahle_Behr.

Anonymous. "Hydraulic cylinders—Thermact—Orbesen teknik", DK-4550 Asnaes, Denmark, Jan. 1, 2018 (Jan. 1, 2018), pp. 1-4, Retrieved from the Internet: https://orbesenteknik.com/thermact/.

Anonymous. "Thermact, Ventilation non-electric" Jan. 1, 2018 (Jan. 1, 2018), pp. 1-1, Retrieved from the Internet: https:/orbesenteknik.com/wp-content/uploads/2015/10/ds_thermact_gb_general_description. pdf.

Anonymous. "Ventilation ohne Strom (Nova-Air System), preliminary Datasheet" May 13, 1998 (May 13, 1998), pp. 1-1, Retrieved from the Internet: https://orbesenteknik.com/wp-content/uploads/2015/10/ds_thermact_ de_wax_e20d_novaair. pdf.

Shaw David et al. "Alcohols With Hydrocarbons" Solubility Data Series, International Union of Pure and Applied Chemistry, Analytical Chemistry Division, Commission on Solubility Data, Jan. 1, 1994 (Jan. 1, 1994), pp. 1-320.

Anonymous. "Wax" Jul. 19, 2021 (Jul. 19, 2021). pp. 1-6, https://en.wikipedia.org/wiki/Wax.

Stephen M Mudge. "Fatty Alcohols—a review of their natural synthesis and environmental distribution" The Soap and Detergent Association, Nov. 1, 2005 (Nov. 1, 2005).

Silva Pedro M. et al. "Modulation and Characterization of Wax-Based Olive Oil Organogels in View of Their Application in the Food Industry" Gels, vol. 7, No. 1, Jan. 28, 2021 (Jan. 28, 2021), pp. 1-18.

Kanya et al. "Characterization of wax esters, free fatty alcohols and free fatty acids of crude wax from sunflower seed oil refineries" Food Chemistry, Elsevier Ltd, NL, vol. 101, No. 4, Jan. 1, 2007 (Jan. 1, 2007), pp. 1552-1557.

* cited by examiner

[Fig.1]
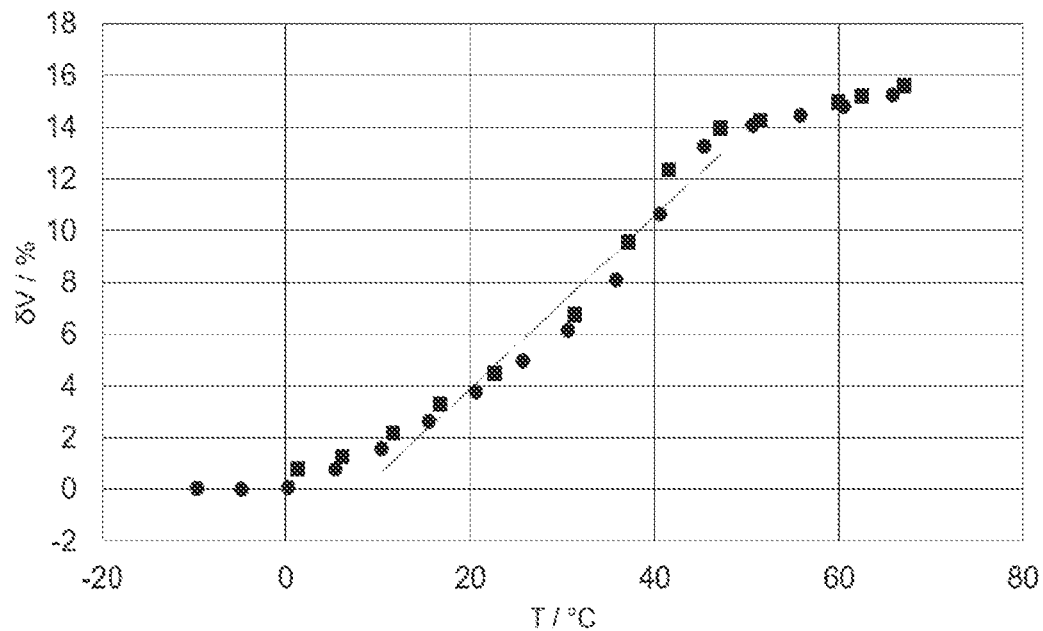
[Fig.2]
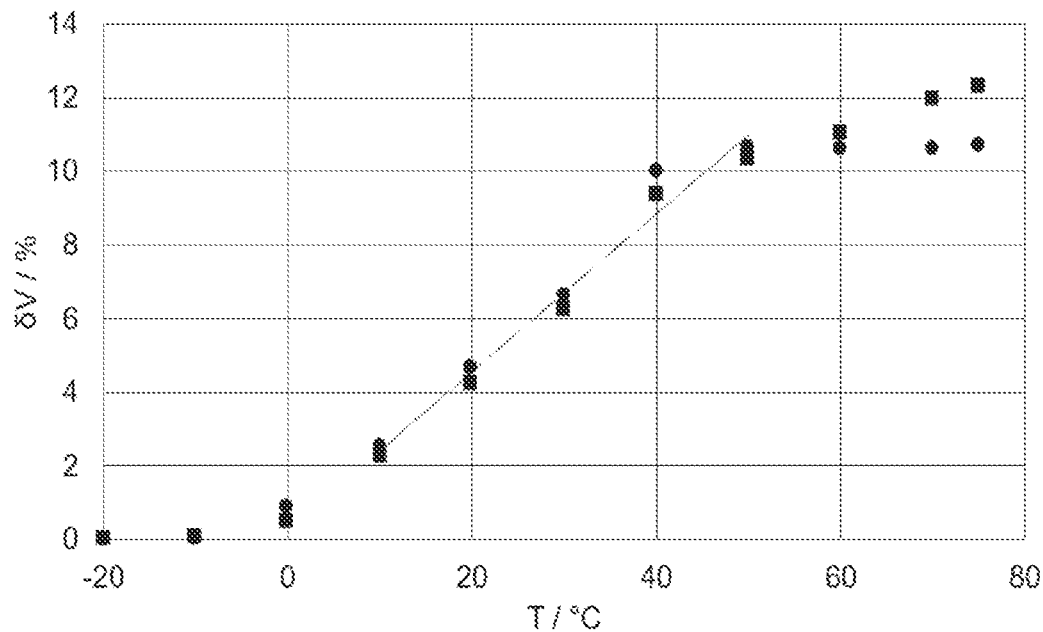

GAS PRESSURE SPRING COMPRISING AN EXPANDING WAX, DRIVE SYSTEM COMPRISING THE GAS PRESSURE SPRING

CROSS-REFERENCE TO RELATED APPLICATIONS

This application claims priority to PCT Application No. PCT/EP2021/063016, having a filing date of May 17, 2021, based on German Application No. 10 2020 113 749.4, having a filing date of May 20, 2020, the entire contents both of which are hereby incorporated by reference.

FIELD OF TECHNOLOGY

The following relates to a gas pressure spring comprising an expanding wax as a compensating medium for reducing a temperature dependency of a spring force of the gas pressure spring in an operating temperature range of the gas pressure spring spanning a minimum temperature up to a maximum temperature.

The following further relates to a drive system for a flap comprising a gas pressure spring for supporting the flap and an electromechanical drive for driving the flap.

BACKGROUND

Due to the fact that the pressure of the used operating gas increases with the temperature (in case of an ideal operating gas linearly), a gas spring characteristic involving a temperature-dependent spring force is obtained in gas pressure springs. However, in many applications, for example in drive systems for flaps, particularly vehicle flaps, a temperature-independent spring force is desired. Therefore, gas pressure springs designed to compensate the temperature dependency of the gas spring characteristic with the aid of a compensating medium are known from conventional art.

For this purpose, the gas pressure spring comprises, for example, a working cylinder defining a working chamber filled with a working medium together with a compensating piston arrangement, and a working rod slidably protruding into the working chamber through an opening of the working cylinder as described in EP 1 795 777 A2. Here, the compensating piston arrangement is acted upon by the pressure of the working medium and the pressure of the compensating medium provided in a compensating chamber and expanding with an increase in temperature so that the volume of the working chamber is increased. For the compensating piston to reversibly return into its initial position when the temperature decreases, it may, in addition, be acted upon by a return medium provided in a return chamber so that the volume of the working chamber is reduced.

With regard to the substances usable as the compensating medium, DE 31 41 295 A1 generally refers to a "special liquid". By contrast, hydraulic oil is expressly mentioned as a compensating medium in the document DE 25 11 289 A1 originating from the same subject area. According to U.S. Pat. No. 4,613,115, finally, two-phase systems of specific substances, more precisely systems in which the liquid and the gaseous phase of the observed substance coexist under the respective pressure-temperature conditions, are used as the compensating medium.

However, none of these compensating media have proven satisfactory in every respect in practice. Particularly, the conventionally used mineral oil exhibits an insufficient usable volume expansion in the commonly observed range of operating states of the gas pressure spring. In two-phase systems, the high-volume expansion mainly resulting from the gaseous phase comes to naught due to the high compressibility of the gaseous phase.

According to EP 1 795 777 A2, the compensating medium is a liquid just below its boiling temperature or in a hyper-critical state since such a liquid, on the one hand, exhibits a relatively high-volume expansion but, on the other hand, due to its property of still being a liquid, is substantially incompressible. As examples of compensating media, carbon dioxide ($CO_2$), ethane ($C_2H_6$), propane ($C_3H_8$), hydrogen sulphide ($H_2S$), ammoniac ($NH_3$), methylene chloride ($CH_3Cl$), sulphur dioxide ($SO_2$), and sulphur hexafluoride ($SF_6$) are named. However, it is disadvantageous in these compensating media that they can only be introduced into a gas pressure spring and permanently held there with great effort, particularly since they are highly volatile and partly also corrosive and/or toxic. Moreover, many of these compensating media are easily inflammable which, for safety reasons and transport law-related reasons, is problematic particularly for the use in vehicles.

SUMMARY

An aspect relates to a gas pressure spring which is particularly simple to produce and durable, and a drive system for a flap comprising it, the temperature dependency of the gas spring characteristic being reliably compensated.

Embodiments of the invention relate to a gas pressure spring comprising an expanding wax as a compensating medium for reducing a temperature dependency of a spring force of the gas pressure spring in an operating temperature range of the gas pressure spring spanning a minimum temperature, particularly of −40° C. to +10° C., up to a maximum temperature, particularly of +40° C. to +100° C.

For example, the gas pressure spring may be substantially designed like the gas pressure springs described in DE 31 41 295 A1 or in EP 1 795 777 A2. The gas pressure spring comprises a working cylinder defining a working chamber filled with a, particularly gaseous, working medium together with a compensating piston arrangement, and a working rod slidably protruding into the working chamber through an opening of the working cylinder. Here, the compensating piston arrangement is acted upon by the pressure of the working medium and the pressure of the compensating medium provided in a compensating chamber and expanding with an increase in temperature so that the volume of the working chamber is increased.

For the compensating piston to reversibly return into its initial position when the temperature decreases it may, in addition, be acted upon by a return medium provided in a return chamber so that the volume of the working chamber is reduced.

In case of an increase in temperature within the operating temperature range, the expanding wax experiences at least one phase transition, particularly from a wax-like solid to a liquid phase, involving a significant relative increase in volume, for example by 5% to 20%, particularly by 10% to 15%. In this way, the increase in volume of the expanding wax can be used to enlarge the working chamber of the gas pressure spring to prevent an increase in the pressure of the working medium and an associated increase in the spring force of the gas pressure spring resulting from the increase in temperature.

The relative increase in volume $\delta V$ is defined as the quotient of the absolute increase in volume $\Delta V$ divided by the volume $V_{Tmin}$ at the minimum temperature. The absolute increase in volume $\Delta V$ is the difference of the volume $V_{Tmax}$ at the maximum temperature Tmax of the operating temperature range minus the volume $V_{Tmin}$ at the minimum temperature Tmin of the operating temperature range:

$$\delta V = \Delta V/V_{Tmin} = (V_{Tmax} - V_{Tmin})/V_{Tmin}$$

For an operating temperature range of a minimum temperature of Tmin=−30° C. to a maximum temperature of Tmax=+80° C., a relative increase in volume δV of 14% to 18% is obtained.

In this application, temperature-related effects are generally described based on the example of an increase in temperature. Generally, it is assumed that the temperature-dependent effects are reversible, i.e., that they are substantially reversed in case of a decrease in temperature as compared to an increase in temperature.

As compared to other working media, an expanding wax is advantageous in that it can be easily introduced into the gas pressure spring due to its wax-like consistency and low chemical reactivity. Moreover, since it is solid or liquid and has a low chemical reactivity in the operating temperature range, it can be permanently confined in the gas pressure spring in a simple manner so that it will reliably function in the long term.

The expanding wax comprises at least one liquid phase and at least one solid phase in the entire operating temperature range. Due to the coexistence of at least one solid and at least one liquid phase, an at least approximately linear increase in the volume of the expanding wax will take place in the event of an increase in temperature, whereby the generally likewise approximately linear increase in the pressure of the working medium can be almost fully compensated over the entire operating temperature range.

Due to the fact that there is at least one liquid phase and at least one solid phase across the entire operating temperature range, the expanding wax differs from expanding waxes commonly used in thermostat valves in which a liquid and a solid phase should only coexist in the narrowest possible temperature range to achieve a well-defined switching temperature of the thermostat valve.

The at least one liquid phase and the at least one solid phase are combined or form a gel to achieve a homogenous temperature-dependent change of the volume of the compensating medium and to avoid potential interfacial effects which might affect the linearity of the change of the volume. However, the at least one liquid phase and the at least one solid phase may also be spatially separated from each other by at least one phase boundary.

Properties of substances and mixtures of substances indicated in this application relate to the standard pressure (100 kPa) unless otherwise specified.

The expanding wax comprises a number of primary alcohols. Primary alcohols as a compensating medium offer a variety of advantages, particularly, they cannot be mixed with water and therefore constitute a protection against corrosion for the gas pressure spring. Apart from this, primary alcohols react neutrally and pose no risk to health. Moreover, primary alcohols having a defined chain length and thus a defined melting temperature are readily available.

The minimum temperature is −30° C. to 0° C., particularly −20° C. to −10° C. The maximum temperature is +50° C. to +80° C., particularly +60° C. to +70° C. With the aforementioned minimum temperatures and maximum temperatures, an operating temperature range covering a multitude of typical fields of application of gas pressure springs, particularly in vehicle construction, is obtained so that undesired effects of a temperature dependency of the spring force of the gas pressure spring in typical fields of application are avoided.

The expanding wax comprises a number of alkanes, a plurality of alkanes having chain lengths which differ from each other, the alkanes having a minimum chain length within the range of 5 to 20, or of 10 to 15, and a maximum chain length within the range of 20 to 35, or of 25 to 30.

The expanding wax may, for example, comprise 10 to 25, particularly 15 to 20 alkanes having chain lengths which differ from each other.

As a compensating medium, alkanes offer a variety of advantages; in particular, they are of a low reactivity due to the stable carbon chains without functional groups, hardly inflammable from a certain chain length, and only cleavable in the presence of catalysts. Furthermore, alkanes are intermixable, pose no risk to health, are available at low costs, and constitute a protection against corrosion for the gas pressure spring due to their hydrophobic property from a chain length of about 16.

Moreover, the melting temperatures of alkanes having proximate chain lengths are close to each other. With another carbon atom in the chain, the melting temperature typically increases by about 3 K. The narrow gradation of the melting temperatures allows for the adjustment of a particularly uniform expansion of the expanding material over the entire operating temperature range.

Alkanes having the aforementioned chain lengths have melting temperatures distributed across the operating temperature range of the gas pressure spring, and thereby ensure that at least one liquid and at least one solid phase coexist in the compensating medium across the entire operating temperature range. Experiments have shown that the melting temperatures of the alkanes in the compensating medium do not substantially deviate from the associated melting temperatures of the alkanes as pure substances.

Disadvantageous in alkanes is that elaborate separation methods are required to obtain alkanes having a precisely defined chain length or a precisely defined mixture of chain lengths.

The expanding wax comprises or consists of a plurality of primary alcohols having chain lengths which differ from each other, the primary alcohols having a minimum chain length within the range of 3 to 15, or of 5 to 10, and a maximum chain length within the range of 10 to or of 15 to 20.

The expanding wax may, for example, comprise 2 to 15, particularly 5 to 10, primary alcohols having chain lengths which differ from each other.

Primary alcohols having the aforementioned chain lengths have melting temperatures distributed throughout the operating temperature range of the gas pressure spring and thereby ensure that at least one liquid and at least one solid phase coexist in the compensating medium across the entire operating temperature range. Experiments have shown that the melting temperatures of the primary alcohols in the compensating medium do not substantially deviate from the associated melting temperatures of the primary alcohols as pure substances.

The expanding wax comprises or consists of a number of alkanes and a number of primary alcohols having chain lengths which differ from each other. Primary alcohols are generally mixable with alkanes so that, a homogenous expanding wax can be produced from primary alcohols and alkanes.

At extremely short chain lengths of, for example, eight to ten carbon atoms, primary alcohols are characterised by a low melting point of −16° C. to 7° C. at a simultaneously relatively high flash point relative to alkanes having the same melting temperature. Therefore, a low minimum temperature can be achieved with primary alcohols without producing a high flammability of the expanding wax thereby.

Apart from this, primary alcohols have a high melting temperature of 49° C. to 59° C. even at relatively short chain lengths of, for example, 16 to 18 carbon atoms. The melting temperature of an alkane having 18 carbon atoms, on the other hand, is only 28° C. Therefore, a high maximum temperature can be achieved with relatively short-chained primary alcohols. For the same maximum temperature, alkanes having a considerably larger chain length which would be chemically less stable and more expensive than the more short-chained primary alcohols would be required.

Mixtures of primary alcohols are generally more expensive than mixtures of alkanes. Apart from this, the melting temperatures of primary alcohols having proximate chain lengths are further apart than in alkanes. Therefore, it is more difficult to adjust a uniform expansion of the expanding wax across the entire operating temperature range with primary alcohols than with alkanes.

For providing an expanding wax which is as cost-effective and safe as possible and exhibits a uniform expansion across the entire operating temperature range, it is therefore particularly advantageous that the expanding wax comprises a number of primary alcohols and a number of alkanes.

The chain lengths of the primary alcohols and/or of the alkanes are in the aforementioned ranges. The expanding wax may, for example, comprise or consist of primary alcohols having chain lengths of 8 to 18 carbon atoms and alkanes having chain lengths of 14 to 25 carbon atoms.

The primary alcohols contained in the expanding wax comprise a number of primary alcohols having a lower melting temperature than all alkanes contained in the expanding wax, and/or a number of primary alcohols having a higher melting temperature than all alkanes contained in the expanding wax.

At the upper and/or lower margin of the operating temperature range, therefore, primary alcohols are used instead of alkanes to ensure a uniform expansion of the expanding wax without increasing the flammability and the costs of the expanding wax or reducing the chemical stability of the expanding wax. In a medium range of the operating temperature range, on the other hand, alkanes are used to ensure low costs and a uniform expansion of the expanding wax due to the closely-spaced melting temperatures of the alkanes. With this combination of primary alcohols and alkanes, therefore, the respective advantages of both substance groups are optimally used.

The primary alcohols constitute a percentage of the substance amount of 1% to 30%, or 10% to 25%, of the expanding wax. With such a percentage of the substance amount, the melting behavior of the expanding wax according to embodiments of the invention and a high application safety of the gas pressure spring can be achieved at low costs. A melting behavior according to embodiments of the invention is achieved, for example, by an expanding wax composed of 25% octanol and 75% of the commercially available alkane expanding wax RubiTherm RT35.

The expanding wax comprises at least one antioxidant to avoid a potential degradation of the expanding wax, particularly of primary alcohols, by reactions with oxygen. The antioxidant comprises, for example, ascorbyl palmitate. It is soluble in oils, readily available, and safe. The antioxidant constitutes, for example, a percentage of the substance amount of the expanding wax of 0.1% to 10%, particularly of 0.5% to 5%.

The expanding wax comprises at least one oil, a standard system oil for gas pressure springs, for example, the oil sold by the company Fuchs Schmierstoffe GmbH under the trade name Titan SAF 1720. A system oil is advantageous in that it can be used both as a constituent of the expanding wax and for improving the tribological properties of the gas pressure spring. The oil constitutes, for example, a percentage of the substance amount of the expanding wax of to 10%, particularly of 0.5% to 5%. The oil is advantageous in that it exists as the liquid phase even at low temperatures, for example below −10° C., and therefore ensures the function of the expanding wax at low temperatures. In addition, the oil can also function as a lubricant and/or damping agent for the gas pressure spring and thereby prolong its service life.

Embodiments of the invention relate to a drive system for a flap comprising a gas pressure spring according to embodiments of the invention for supporting the flap, and an electromechanical drive, for example a linear drive, particularly a spindle drive, for driving the flap. For example, the flap may be a flap of a vehicle, particularly a bonnet, a boot lid, a trunk lid, or a gull-wing door.

Drive systems for a flap comprising a gas pressure spring for supporting the flap and an electromechanical drive for driving the flap are known in conventional art. Except for the use of a gas pressure spring according to embodiments of the invention instead of a generic one, the drive system according to embodiments of the invention may be designed like a corresponding drive system according to conventional art, for example, according to DE 103 13 440 A1 or DE 2008 045 903 A1.

The gas pressure spring of the drive system serves to support the flap in any position against gravity while the electromechanical drive serves to open and close the flap. In addition, a manual operation of the flap may be contemplated like in DE 103 13 440 A1 and DE 10 2008 045 903 A1.

The gas pressure spring has to have a spring force which is so high that it can support the flap even at low ambient temperatures. Since the spring force increases with rising temperatures in common gas pressure springs this results in that a very strong force has to be applied by the electromechanical drive or an operator to close the flap at high temperatures. Therefore, the drive system has to comprise a very powerful electromechanical drive which is expensive, occupies a lot of installation space, and consumes a lot of energy in operation. Apart from this, there will be a high level of wear of the electromechanical drive and other components mechanically connected to the flap, for example hinges.

In conventional art, these problems are avoided by using a suspension strut instead of the gas pressure spring (e.g., DE10 2008 045 903 A1). Even though a suspension strut has an almost temperature-independent spring force it is lager, heavier, and more expensive than a gas pressure spring having a comparable spring force.

By using a temperature compensated gas pressure spring according to embodiments of the invention instead of a standard gas pressure spring, therefore, a particularly cost-effective, easy-to-produce, durable, compact, energy-saving, and easy-to-handle drive system for a flap is provided.

BRIEF DESCRIPTION

Some of the embodiments will be described in detail, with references to the following Figures, wherein like designations denote like members, wherein:

FIG. 1 shows the relative change of the volume of an expanding wax of a gas pressure spring according to embodiments of the invention depending on the temperature; and FIG. 2 shows the relative change of the volume of another expanding wax of a gas pressure spring according to embodiments of the invention depending on the temperature.

DETAILED DESCRIPTION

FIG. 1 shows the relative change of the volume δV in % of an expanding wax of a gas pressure spring according to embodiments of the invention depending on the temperature T in ° C.

The expanding wax examined for FIG. 1 was produced by mixing the commercially available waxes RubiTherm RT35, Mahle-Beer, and Paramelt Dilavest 0-30 at equal proportions and contains the alkanes listed in the following Table 1. The substance amount proportions were determined by gas chromatography.

TABLE 1

| Name | Chain length | Melting temperature/° C. | Percentage of the substance amount/% |
|---|---|---|---|
| n-dodecane | 12 | −10 | 0.0 |
| n-tridecane | 13 | −5 | 0.1 |
| n-tetradecane | 14 | 6 | 9.5 |
| n-pentadecane | 15 | 9 | 6.2 |
| n-hexadecane | 16 | 18 | 3.9 |
| n-heptadecane | 17 | 21 | 6.5 |
| n-octadecane | 18 | 28 | 15.8 |
| n-nonadecane | 19 | 32 | 9.1 |
| n-eicosane | 20 | 37 | 10.4 |
| n-heneicosane | 21 | 40 | 11.2 |
| n-docosane | 22 | 44 | 9.1 |
| n-tricosane | 23 | 48 | 6.1 |
| n-tetracosane | 24 | 50 | 4.4 |
| n-pentacosane | 25 | 54 | 3.1 |
| n-hexacosane | 26 | 56 | 1.8 |
| n-heptacosane | 27 | 59 | 0.8 |
| n-octacosane | 28 | 61 | 0.3 |
| n-nonacosane | 29 | 64 | 0.3 |
| n-triacontane | 30 | 65 | 0.0 |
| Total | | | 98.5 |

For measuring the temperature dependency of the volume of the expanding wax, an initial volume of 3198.4 mm 3 of the expanding wax was filled into a cylindrical measuring cartridge (6 mm inner diameter, 114 mm inner length) using a cylindrical plunger (3.98 mm diameter, 12.4 mm 2 cross-sectional area) at an initial temperature of −10° C.

The measuring cartridge was subjected to a temperature ramp in a temperature control oven. At each examined temperature, the path the plunger had been driven out of the cartridge as compared to the initial temperature by the expansion of the expanding wax against a counterforce of 3 N was detected using a displacement detector after a waiting time of about min.

The relative change of the volume of the expanding wax was calculated as the product of the detected path and the cross-sectional area of the plunger divided by the initial volume. FIG. 1 shows the values obtained in this way for the rise in temperature (circles) and the reduction of the temperature (squares) of the expanding wax.

The essential components (percentage of the substance amount >5%) of the expanding wax examined for FIG. 1 have melting temperatures within the range of 6° C. to 48° C. (Table 1). Consequently, the expanding wax comprises at least one solid and at least one liquid phase in an entire operating temperature range of about 10° C. to about 50° C.

As can be seen in FIG. 1, this results in an approximately linear relative increase in volume with a rising temperature in the operating temperature range. A linear regression (dotted line) of the measuring data in this range shows a correlation coefficient of $R^2=0.96$.

Altogether, a relative increase in volume of 15% is reached over the examined temperature range of −10° C. to +60° C. which is sufficient to compensate the temperature dependency of the gas pressure spring. With a relative increase in volume of about 15%, it is possible to realise a compensation stroke which is sufficient to fully compensate or even overcompensate the temperature dependency of the gas spring at suitable translation ratios in the construction.

An overcompensation offers the possibility of working quite flexibly and of appropriately adjusting precisely the desired expansion for each gas pressure spring type by admixing corresponding oils exhibiting a lower increase in volume.

FIG. 2 shows the relative change of the volume δV in % of another expanding wax of a gas pressure spring according to embodiments of the invention depending on the temperature T in ° C.

The expanding wax examined for FIG. 2 was produced by mixing three commercially available waxes from the company Orbesen having melting ranges of 6° C. to 12° C., of 15° C. to and of 56° C. to 62° C. at equal proportions and contains the primary alcohols listed in the following Table 2. The substance amount proportions were determined by gas chromatography.

TABLE 2

| Name | Chain length | Melting temperature/° C. | Percentage of the substance amount/% |
|---|---|---|---|
| n-octanol | 8 | −16 | 0.0 |
| n-decanol | 10 | 7 | 43.8 |
| n-dodecanol | 12 | 24 | 0.0 |
| n-tetradecanol | 14 | 38 | 24.0 |
| n-hexadecanol | 16 | 49 | 31.4 |
| n-octadecanol | 18 | 59 | 0.0 |
| Total | | | 99.3 |

The relative change of the volume of the expanding wax was determined as described in connection with FIG. 1. In contrast to FIG. 1, an initial temperature of −20° C. was selected.

The essential components (percentage of the substance amount >5%) of the expanding wax examined for FIG. 1 have melting temperatures within the range of 7° C. to 59° C. (Table 2). Consequently, the expanding wax exhibits at least one solid and at least one liquid phase in an entire operating temperature range of about 10° C. to about 50° C.

As can be seen in FIG. 2, this results in an approximately linear relative increase in volume with rising temperatures in the operating temperature range. A linear regression (dotted line) of the measuring data in this range shows a correlation coefficient of $R^2=0.98$.

Altogether, a relative increase in volume of 12% is reached over the examined temperature range of −20° C. to +75° C. which is sufficient to compensate or even overcompensate the temperature dependency of the gas pressure spring.

Although the invention has been illustrated and described in greater detail with reference to the exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A gas pressure spring comprising an expanding wax as a compensating medium for reducing a temperature dependency of a spring force of the gas pressure spring in an operating temperature range of the gas pressure spring spanning a minimum temperature of −40° C. to +10° C. up to a maximum temperature of +50° C. to +100° C.,
   a. wherein the expanding wax comprises at least one liquid phase and at least one solid phase in the entire operating temperature range;
   b. wherein the expanding wax is composed of a number of alkanes and a number of primary alcohols having chain lengths which differ from each other;
   c. wherein the primary alcohols constitute a percentage of the substance amount of 10% to 30% of the expanding wax; and
   d. wherein the primary alcohols contained in the expanding wax
      i. comprise a number of primary alcohols having a lower melting temperature than all alkanes contained in the expanding wax, and/or
      ii. comprise a number of primary alcohols having a higher melting temperature than all alkanes contained in the expanding wax.

2. The gas pressure spring according to claim 1, wherein the minimum temperature is −30° C. to 0° C. or −20° C. to −10° C.

3. The gas pressure spring according to claim 1, wherein the maximum temperature is +50° C. to +80° C.

4. The gas pressure spring according to claim 1, wherein the expanding wax comprises a plurality of alkanes having chain lengths which differ from each other.

5. The gas pressure spring according claim 1, wherein the alkanes have a minimum chain length within the range of 5 to 20, and a maximum chain length within the range of 20 to 35.

6. The gas pressure spring according to claim 1, wherein the primary alcohols constitute a percentage of the substance amount of 10% to 25% of the expanding wax.

7. The gas pressure spring according to claim 1, wherein the expanding wax comprises a plurality of primary alcohols having chain lengths which differ from each other.

8. The gas pressure spring according to claim 1, wherein the primary alcohols have a minimum chain length within the range of 3 to 15 and a maximum chain length within the range of 10 to 25.

9. A drive system for a flap comprising:
   a. a gas pressure spring according to one of the claims 1 to 5 or 6 to 8 for supporting the flap; and
   b. an electromechanical drive for driving the flap.

* * * * *